(12) United States Patent
Itoh et al.

(10) Patent No.: US 7,096,099 B2
(45) Date of Patent: Aug. 22, 2006

(54) CONTROLLER WITH MOTOR OUTPUT TORQUE LIMITER FOR HYBRID VEHICLE

(75) Inventors: Yoshiki Itoh, Shizuoka-ken (JP); Tatsuji Mori, Shizuoka-ken (JP); Norihiro Noda, Shizuoka-ken (JP)

(73) Assignee: Suzuki Motor Corporation, Shizuoka-Ken (JP)

( * ) Notice: Subject to any disclaimer, the term of this patent is extended or adjusted under 35 U.S.C. 154(b) by 210 days.

(21) Appl. No.: 10/760,840

(22) Filed: Jan. 20, 2004

(65) Prior Publication Data

US 2004/0148072 A1    Jul. 29, 2004

(30) Foreign Application Priority Data

Jan. 21, 2003   (JP)   ............................. 2003-012126

(51) Int. Cl.
*B60K 41/04*    (2006.01)
(52) U.S. Cl. .................. 701/22; 903/917; 903/926; 903/927; 903/920; 903/942; 903/908; 903/945; 180/65.3; 477/109
(58) Field of Classification Search ................ 477/109; 701/22; 903/908, 922, 940, 942, 917, 945, 903/926, 927, 920; 193/3.31, 103 C, 3.28; 180/65.2, 65.3; B60L 7/14; B60K 6/00, B60K 8/00
See application file for complete search history.

(56) References Cited

U.S. PATENT DOCUMENTS

| | | | | |
|---|---|---|---|---|
| 4,730,709 A | * | 3/1988 | Kawata et al. ............. | 192/3.31 |
| 5,348,127 A | * | 9/1994 | Murata et al. ............... | 192/3.3 |
| 5,856,709 A | * | 1/1999 | Ibaraki et al. ................ | 290/45 |
| 5,982,045 A | * | 11/1999 | Tabata et al. ................. | 290/17 |
| 5,984,034 A | * | 11/1999 | Morisawa et al. ......... | 180/65.2 |
| 6,183,389 B1 | * | 2/2001 | Tabata .......................... | 477/5 |
| 6,199,650 B1 | * | 3/2001 | Masberg et al. ............ | 180/197 |
| 6,364,807 B1 | * | 4/2002 | Koneda et al. ................ | 477/5 |
| 6,428,444 B1 | * | 8/2002 | Tabata ........................... | 477/3 |
| 6,543,565 B1 | * | 4/2003 | Phillips et al. ............. | 180/165 |
| 6,726,593 B1 | * | 4/2004 | Yamamoto et al. ........... | 477/5 |
| 2002/0058565 A1 | * | 5/2002 | Yamamoto et al. ........... | 477/5 |
| 2002/0134596 A1 | * | 9/2002 | Morimoto et al. ......... | 180/65.2 |
| 2003/0109357 A1 | * | 6/2003 | Tabata ....................... | 477/109 |

FOREIGN PATENT DOCUMENTS

| | | | | |
|---|---|---|---|---|
| DE | 10254468 A1 | * | 6/2003 | |
| DE | 60112384 T2 | * | 4/2006 | |
| EP | 1205329 B1 | * | 8/2005 | |
| GB | 2084673 | * | 9/1981 | |
| JP | 09-84210 | | 3/1997 | |
| JP | 2000134713 A2 | * | 5/2000 | |
| JP | 2000-197209 | | 7/2000 | |
| JP | 2003232236 A | * | 8/2003 | |

\* cited by examiner

*Primary Examiner*—Cuong Nguyen
(74) *Attorney, Agent, or Firm*—Flynn, Thiel, Boutell & Tanis, P.C.

(57) ABSTRACT

A controller for a hybrid vehicle in which the torque is output from an engine and/or an electric motor and is transmitted to drive wheels through a fluid torque converter and a transmission. The controller includes a motor output torque limiter to restrict the output torque from the electric motor such that the torque increased by the fluid torque converter does not exceed permissible torque which is acceptable for the transmission to receive when the electric motor in addition to the engine is driven.

2 Claims, 5 Drawing Sheets

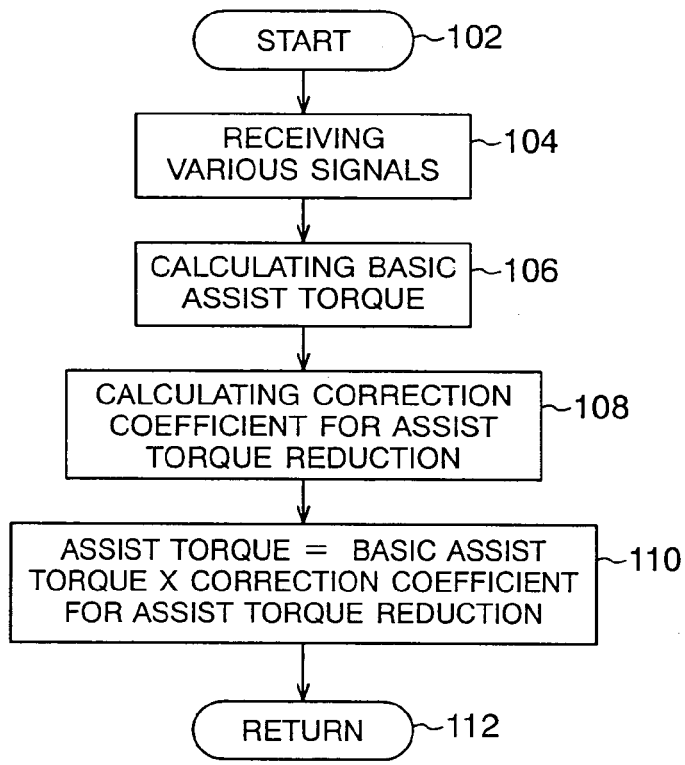
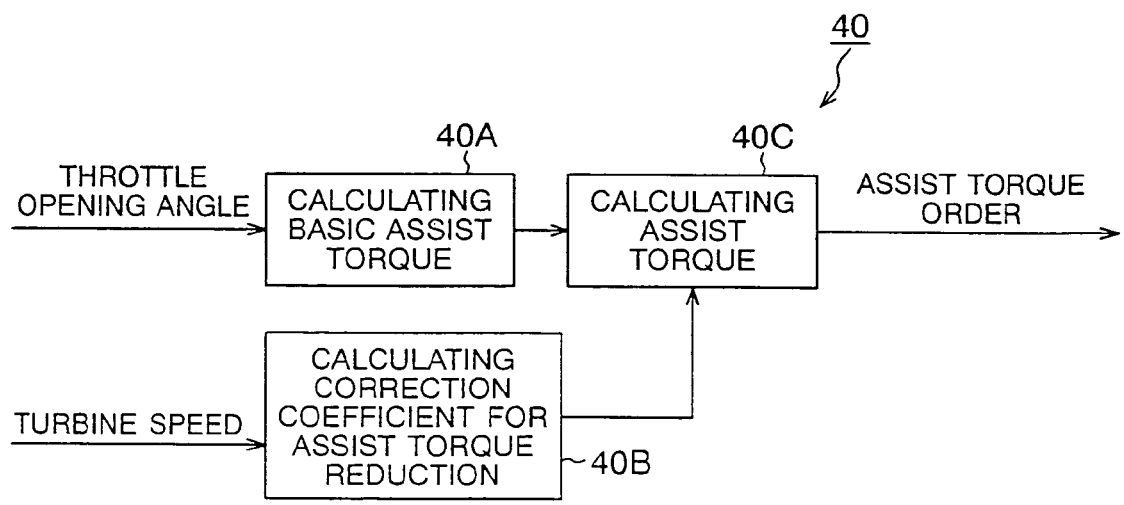

CALCULATION TABLE FOR BASIC ASSIST TORQUE

CALCULATION TABLE FOR CORRECTION COEFFICIENT FOR ASSIST TORQUE REDUCTION

CONTROLLER WITH MOTOR OUTPUT TORQUE LIMITER FOR HYBRID VEHICLE

CROSS REFERENCE TO RELATED APPLICATIONS

This application is related to the following copending applications: (1) Ser. No. 10/760 839 filed Jan. 20, 2004, and titled "CONTROLLER FOR HYBRID VEHICLE"; (2) Ser. No. 10/760,837 filed Jan. 20, 2004, and titled "ELECTRIC POWER REGENERATION CONTROLLER FOR HYBRID VEHICLE"; and (3) Ser. No. 10/760 838 filed Jan. 20, 2004, and titled "CONTROLLER FOR HYBRID VEHICLE", the entire disclosures of which are herein incorporated by reference.

FIELD OF THE INVENTION

This invention relates to a controller for a hybrid vehicle, and more particularly, a vehicle drive system wherein an electric motor is connected to a crankshaft of an engine and assists the output of the engine, and the controller for the hybrid vehicle controls assist torque in combination with an automatic transmission equipped with a fluid torque converter.

BACKGROUND OF THE INVENTION

In vehicles, there is a hybrid vehicle in which an engine driven by combustion of fuel is directly connected to an electric motor driven by electric power and having a power generating function. In this hybrid vehicle, torque is output from the engine and/or the electric motor and is transmitted to vehicle drive wheels through a fluid torque converter and a transmission. That is, in the vehicle drive system the motor in connection with a crankshaft of the engine assists the output of the engine, and a controller controls the assist torque in combination with the automatic transmission equipped with the fluid torque converter.

Conventionally, the hybrid vehicle is provided with not only the engine but the electric motor (herein "motor") to improve fuel efficiency (see JP Application Laid-Open No. H09-84210 and JP Application Laid-Open No. 2000-197209). In this hybrid vehicle, the motor assists the drive torque if the engine load is heavy or the torque ratio of the torque converter is large, whereas the motor does not assist the drive torque if the engine load is light or the torque ratio of the torque converter is small, so that the motor is driven frequently in a range the efficiency of the engine is relatively high.

However, there are some problems if the motor assists the drive torque under a condition where the engine load is heavy or the torque ratio of the torque converter is large.

That is, under a condition where the engine load is heavy, the torque that the automatic transmission receives, i.e., transmission input torque, becomes large. As shown in FIG. 7, if the ratio "e" between input and output speeds of the torque converter (turbine rotational speed/pump rotational speed) is small, the transmission input torque becomes larger due to the fact that the torque is multiplied by the torque converter before the coupling point. In other words, the torque converter has efficiency "n" increased due to movement of a stator, thereby increasing torque ratio "t". If the electric motor assists the engine under this condition, the transmission input torque may exceed a permissible value or capacity, thereby reducing durability of the automatic transmission.

To obviate this problem, the vehicle is typically provided with an automatic transmission having a large permissible value or capacity for receiving the input torque. However, the larger the permissible capacity for input torque, the heavier and larger the automatic transmission becomes, and the greater the torque lost owing to the friction in the automatic transmission, which is disadvantageous in improving fuel efficiency.

SUMMARY OF THE INVENTION

In order to obviate or minimize the above-mentioned inconveniences, the present invention provides a controller for a hybrid vehicle in which the torque is output from an engine and/or an electric motor and is transmitted to drive wheels through a fluid torque converter and a transmission. The controller includes a motor output torque limiter to restrict the output torque from the electric motor such that the torque increased by the fluid torque converter does not exceed a permissible torque amount which is acceptable for the transmission to receive when the electric motor in addition to the engine is driven.

According to the present invention, the motor output limiter restricts the output torque from the electric motor such that the torque increased by the fluid torque converter does not exceed the amount of torque permissible for the transmission to receive when the electric motor in addition to the engine is driven. This avoids increase in the weight of the transmission and friction which is accompanied by increasing the permissible input torque capacity, and therefore improves the durability of the automatic transmission and increases flexibility in selecting the combination of the engine and the motor with respect to the transmission. Also, the vehicle can be provided with an automatic transmission having smaller permissible input torque capacity so that the weight and dimension and friction torque losses are small so as to improve fuel efficiency.

BRIEF DESCRIPTION OF THE DRAWINGS

FIG. 1 is a flowchart for control of a hybrid vehicle according to the present invention.
FIG. 2 is a block diagram of a motor output limiter.

DETAILED DESCRIPTION

FIGS. 1–6 illustrate an embodiment of the present invention.

Figure 6:
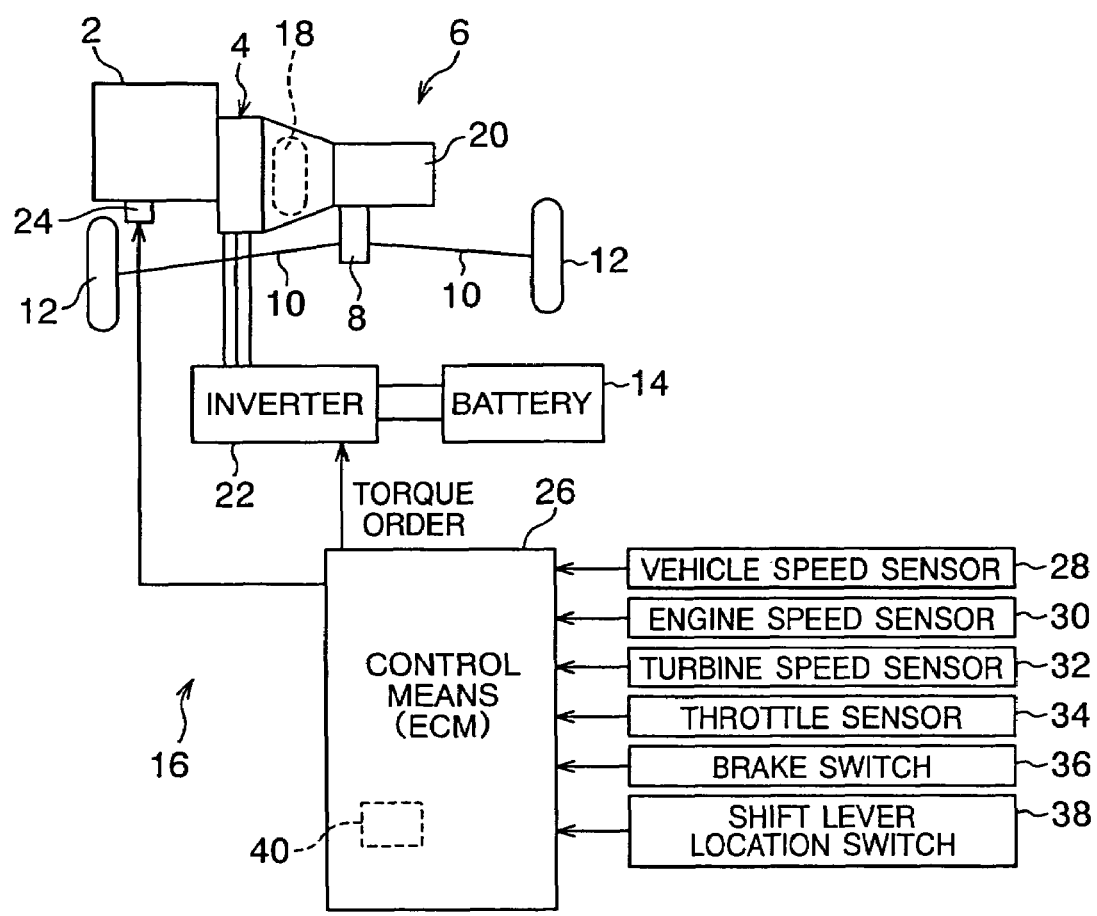
FIG. 6 is a systematic diagram of the controller for the hybrid vehicle.
Figure 7:
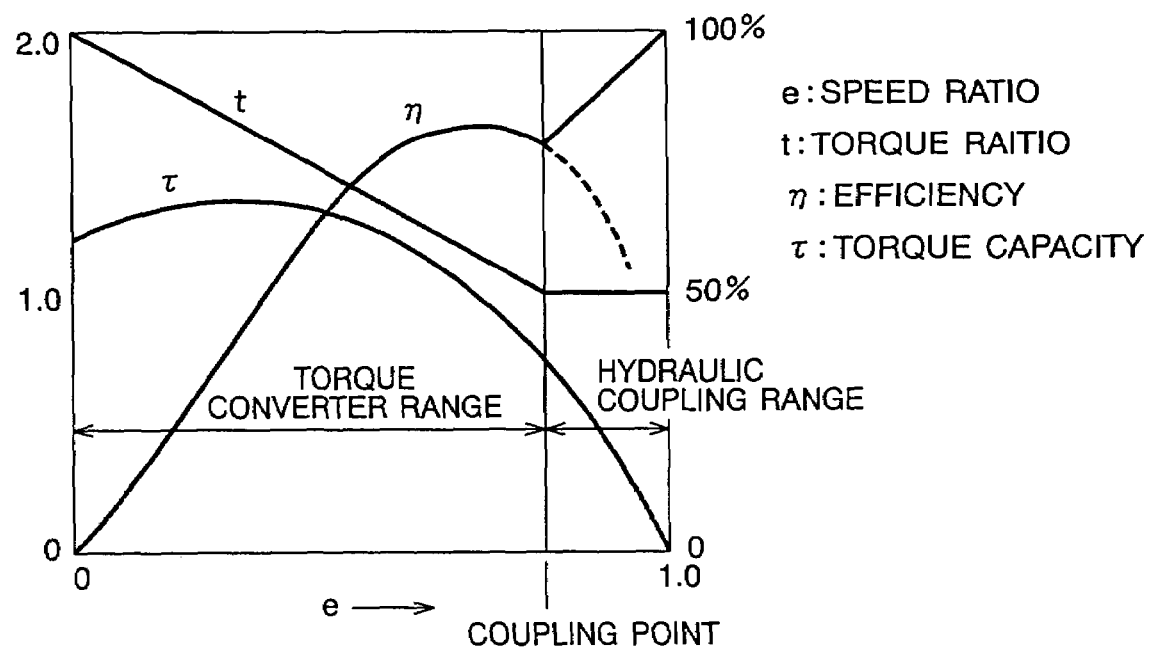
FIG. 7 is a performance curve of the conventional torque converter.

FIG. 6 shows an internal combustion engine 2 mounted on a hybrid vehicle (not shown), an electric motor (assist motor) 4 in connection with a crankshaft (not shown) of the engine 2, an automatic transmission 6, a differential 8, drive shafts 10, vehicle drive wheels 12, a battery 14, and a controller 16. The engine 2 is driven by combustion of fuel. The electric motor 4 is driven by electric power and also functions as a generator. The automatic transmission 6 includes a fluid torque converter 18 and a speed change section (gearing section) 20. This fluid torque converter 18 includes a pump, a stator, and a turbine, which are not shown. The torque is multiplied and transmitted from the pump side to the turbine side of the transmission.

The controller 16 transmits the torque output from the engine 2 and/or the motor 4 to the drive wheels 12 through the automatic transmission 6 having the fluid torque converter 18 and gearing section 20.

The battery 14 is connected to the electric motor 4 through an inverter 22.

The engine 2 is equipped with a fuel injection valve 24 in connection with a control means (electronic control module ECM) 26. This control mean 26 is connected to the inverter 22 so as to provide the motor 4 with the torque order, and also receives signals from a vehicle speed sensor 28 to detect the vehicle speed, an engine speed sensor 30 to detect the engine speed, the turbine speed sensor 32 to detect rotational speed of a turbine of the fluid torque converter 18, a throttle sensor 34 to detect opening angle of a throttle, a brake switch 36 to detect a state in which a brake pedal (not shown) is depressed, and a shift lever position switch 38 to detect location of a shift lever (not shown) for the transmission.

The control means 26 includes a "motor output limiter" 40 which restricts the output torque from the electric motor 4 such that, when the electric motor 4 in addition to the engine 2 is driven, the torque increased by the fluid torque converter 18 does not exceed a permissible input torque which the gearing section 20 in the automatic transmission 6 can receive.

As shown in FIG. 2, the motor output limiter 40 includes a "basic assist torque calculating section" 40A, an "assist torque reduce correction coefficient calculating section" 40B, and an "assist torque calculating section" 40C. More particularly, the basic assist torque calculating section 40A calculates, from the throttle angle, a basic assist torque or basic output torque of the electric motor 4. The assist torque reduce correction coefficient calculating section 40B calculates the correction coefficient or factor that reduces assist torque or output torque based on the turbine rotational speed of the turbine of the fluid torque converter 18. The assist torque calculating section 40C calculates assist torque or output torque by correcting the basic assist torque or basic output torque by the assist torque reduce correction coefficient.

Figure 4:
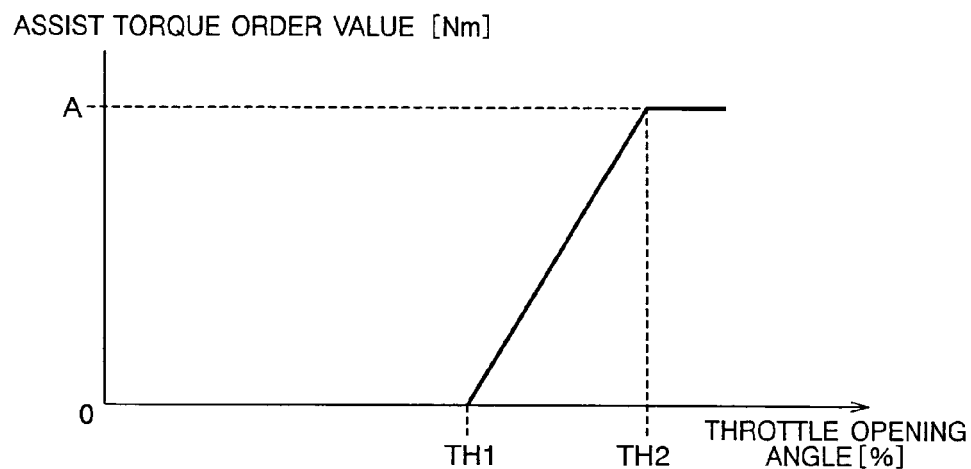
FIG. 4 is a calculation table for basic assist torque.
Figure 5:
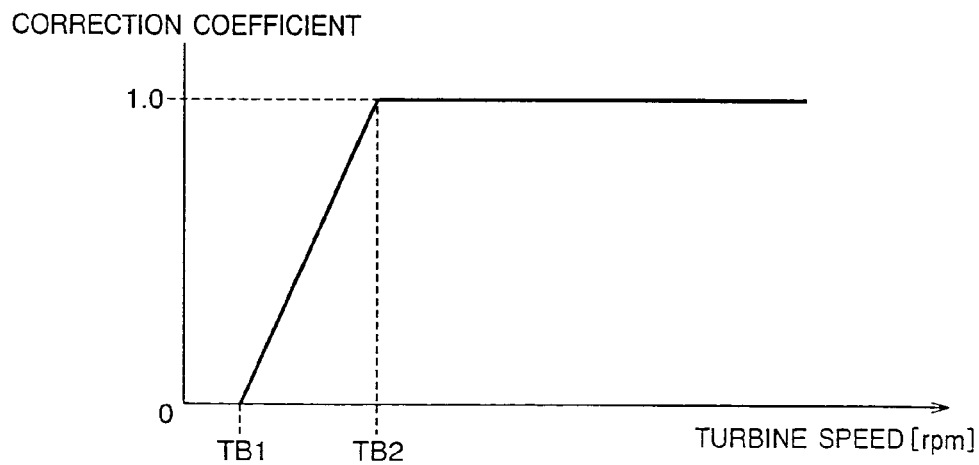
FIG. 5 is a calculation table for correction coefficient for assist torque reduction.

In the basic assist torque calculating section 40A, as shown in FIG. 4, assist torque order value begins to increase at throttle angle TH1 and remains at a constant value A starting at throttle angle TH2. In the assist torque reduce correction factor calculating section 40B, as shown in FIG. 5, a correction coefficient begins to increase at turbine rotational speed TB1 and remains at a coefficient value 1.0upon reaching turbine rotational speed TB2.

The operation of the embodiment of the invention is described as follows with reference to the flowchart in FIG. 1.

A control program for the motor output limiter 40 starts at step 102. The motor output limiter 40 receives signals from various sensors at step 104. The basic assist torque is calculated at step 106. The correction coefficient to reduce the assist torque is calculated at step 108. The assist torque is calculated by multiplying the basic assist torque by the assist torque reduce correction coefficient at step 110. Finally, the program returns at step 112.

Figure 3:
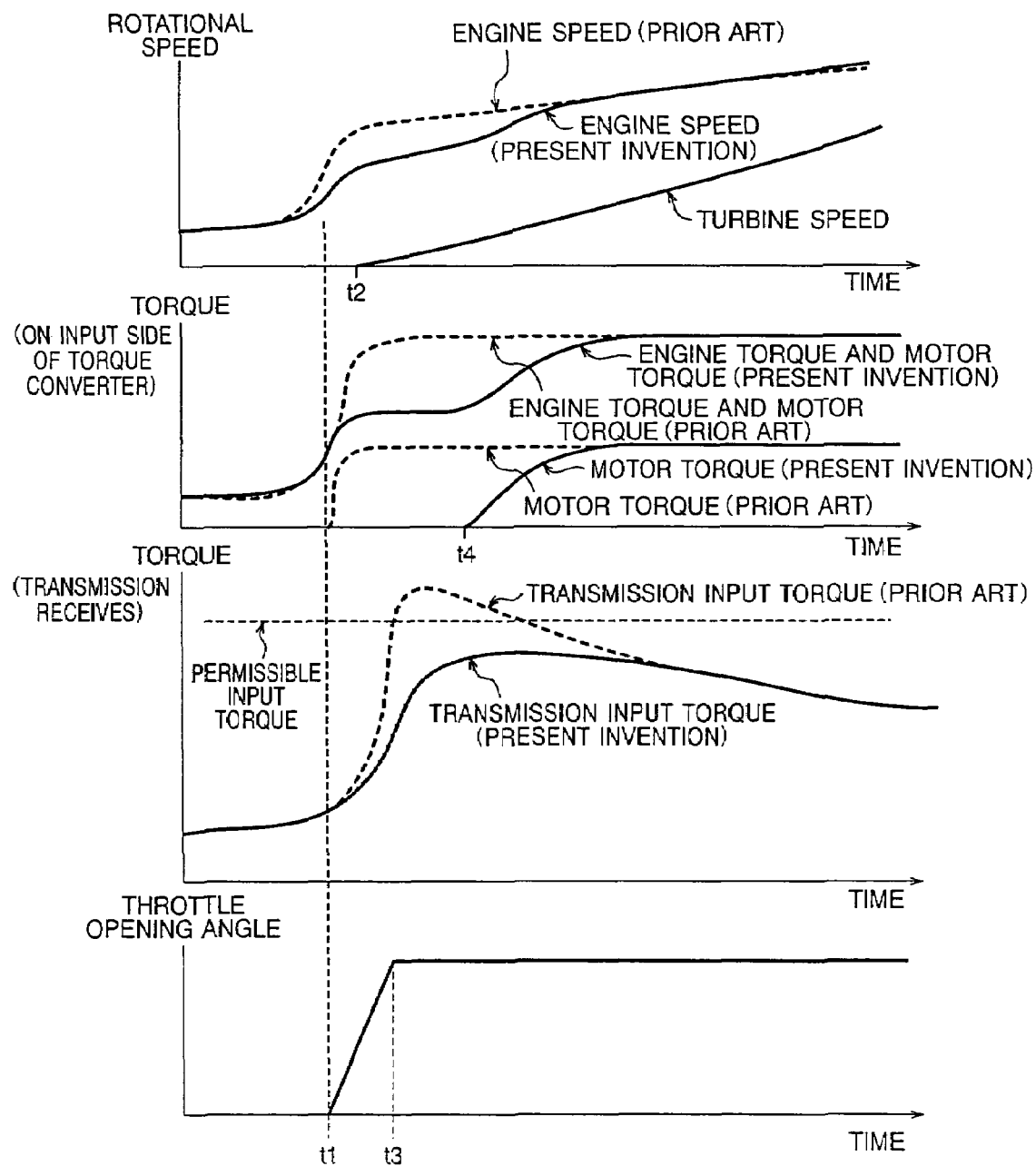
FIG. 3 is a time chart of the control of the hybrid vehicle.

Referring to FIG. 3, conventionally, the engine speed sharply increases as indicated by dashed line when the throttle angle begins to increase at time t1. According to the present invention, however, the engine speed increases gradually, and the turbine speed increases gradually starting at time t2 as indicated by solid lines. With regard to the input torque on an input side of the fluid torque converter, conventionally, the input torque in combination with the engine torque and the motor torque increases sharply as indicated by dashed line. According to the present invention, however, the input torque in combination with the engine torque and the motor torque increases gradually starting at time t4 after the throttle is fully opened (at time t3) as indicated by solid line. Conventionally, the input torque on an input side of the automatic transmission 6 increases sharply and exceeds the permissible input torque value as indicated by dashed line. According to the present invention, the transmission input torque increases gradually and does not exceed the permissible input torque value as indicated by solid line in FIG. 3.

As a result, in the hybrid vehicle having the engine 2 and the assisting motor 4 on the input side of the automatic transmission 6 equipped with the fluid torque converter 18, the assist torque can be limited according to the turbine speed such that the transmission input torque increased by the fluid torque converter 18 does not exceed the permissible torque. This avoids increase in weight of the automatic transmission and increase of friction, which are accompanied by increasing the permissible input torque value, and therefore the durability of the transmission is improved. This also increases flexibility in selecting the combination of the engine 2 and the motor 4 with respect to the transmission. Also, the vehicle can mount an automatic transmission having a smaller permissible input torque value so that the weight and dimension and friction torque losses are small so as to improve fuel efficiency.

In addition, the motor output limiter 40 includes, as shown in FIG. 2, the basic assist torque calculating section 40A which calculates, from the throttle angle, the basic assist torque or basic output torque of the electric motor 4, the assist torque reduce correction coefficient calculating section 40B calculates the correction coefficient or factor that reduces assist torque or output torque based on the turbine rotational speed of the turbine of the fluid torque converter 18, and the assist torque calculating section 40C calculates assist torque or output torque by correcting the basic assist torque or basic output torque by the assist torque reduce correction coefficient. The assist torque is calculated by correcting with the assist torque reduce correction coefficient based on the turbine speed of the turbine of the fluid torque converter 18, and the output of the motor is limited to this calculated torque. Accordingly, even though fluid torque converters having different characteristics are employed, the motor output limiter 40 can easily deal with the different torque converters by changing the output torque reduce coefficient.

Incidentally, in this embodiment of the present invention, the assist torque is limited based on the turbine speed. To obtain the same result, it is only necessary to limit the assist torque such that the torque the automatic transmission receives does not exceed the permissible input torque value. For example, the maximum value of the assist torque can be calculated based on the engine torque calculated from intake air quantity and the torque ratio between the rotational speeds of the fluid torque converter, and the assist torque is set at this calculated maximum value.

Also, the engine can be controlled, or the torque of the torque converter can be limited, or frictional engaging elements in the gearing section of the automatic transmission can be slipped, such that the torque increased by the fluid torque converter does not exceed the permissible input torque for the transmission.

As thus described, the motor output torque limiter restricts the output torque from the electric motor such that the torque increased by the fluid torque converter does not exceed the input torque permissible for the transmission to receive when the electric motor in addition to the engine is driven. This avoids increases in transmission weight and friction which are accompanied by increasing the permissible input torque capacity, and therefore improves the durability of the automatic transmission and increases flexibility in selecting the combination of the engine and the motor with respect to the transmission. Also, the vehicle can mount an automatic transmission having smaller permissible input torque so that the weight and dimension and torque losses are small so as to improve fuel efficiency.

Although a particular preferred embodiment of the invention has been disclosed in detail for illustrative purposes, it will be recognized that variations or modifications of the disclosed apparatus, including the rearrangement of parts, lie within the scope of the present invention.

What is claimed is:

1. A controller for a hybrid vehicle in which the torque is output from an engine and/or an electric motor and is transmitted to drive wheels through a fluid torque converter and a transmission,
    a throttle opening angle detector for detecting an opening angle of a throttle,
    a turbine speed detector for detecting rotational speed of a turbine of the fluid torque converter,
    said controller including a motor output torque limiter to restrict the output torque from said electric motor such that the torque increased by said fluid torque converter does not exceed a permissible input torque which is acceptable for said transmission to receive when said electric motor in addition to said engine is driven,
    said motor output torque limiter including a basic output torque calculating section, an output torque reduce correction coefficient calculating section, and an output torque calculating section,
    wherein said basic output torque calculating section calculates a basic output torque of said electric motor that varies according to the throttle opening angle detected by the throttle opening angle detector,
    wherein said output torque reduce correction coefficient calculating section calculates a correction coefficient for output torque reduction so that the basic output torque is reduced until the turbine rotational speed is at a predetermined speed, based on the turbine rotational speed detected by the turbine speed detector of said fluid torque converter, and
    wherein said output torque calculating section calculates output torque by correcting said basic output torque by said correction coefficient for output torque reduction.

2. The controller for the hybrid vehicle as defined in claim 1, wherein the assist by said motor begins when the opening angle of the throttle exceeds a predetermined angle.

* * * * *